(No Model.)
T. DUNN.
MEANS FOR CONNECTING PNEUMATIC TIRES TO WHEELS.
No. 590,095. Patented Sept. 14, 1897.
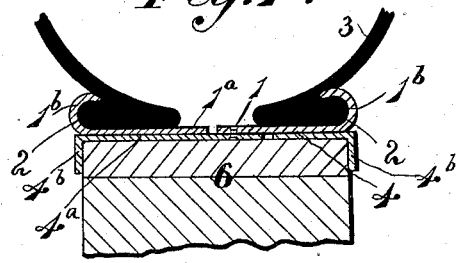
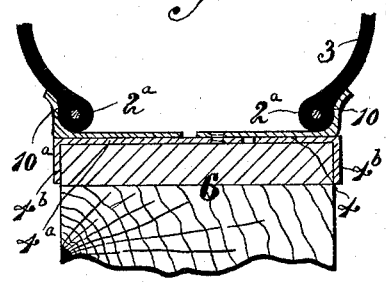
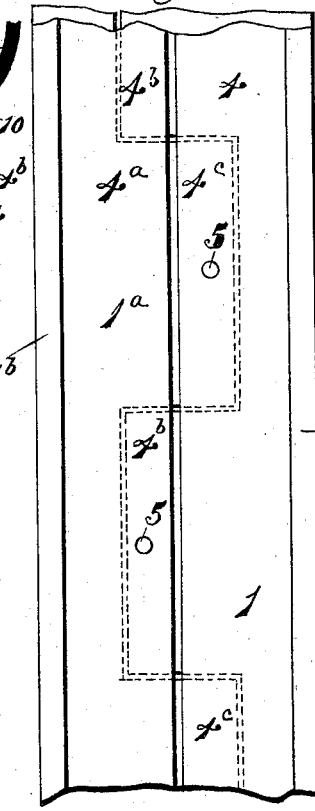
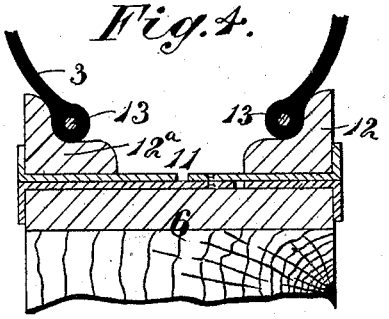
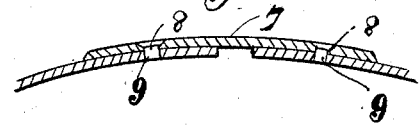
Witnesses.
Geo. E. Frech
Hubert F. Peck
Inventor.
Thomas Dunn
by Pattison & Nesbit
Attys

UNITED STATES PATENT OFFICE.

THOMAS DUNN, OF LONDON, ENGLAND, ASSIGNOR TO THE SELF-FIXING PNEUMATIC VEHICLE AND CYCLE TYRES SYNDICATE, LIMITED, OF SAME PLACE.

MEANS FOR CONNECTING PNEUMATIC TIRES TO WHEELS.

SPECIFICATION forming part of Letters Patent No. 590,095, dated September 14, 1897.

Application filed April 10, 1897. Serial No. 631,554. (No model.) Patented in England January 15, 1896, No. 1,067.

*To all whom it may concern:*

Be it known that I, THOMAS DUNN, a subject of the Queen of Great Britain and Ireland, residing at the city of London, England, have invented Improved Means for Connecting Pneumatic Tires to Ordinary Vehicle-Wheels, (for which a patent has been granted in Great Britain, dated January 15, 1896, No. 1,067,) of which the following is a specification.

This invention has for its object applying to an ordinary vehicle-wheel (that is to say, a wheel having a flat or plain or practically flat or plain rim or periphery) without the use of bolts or the like and without alterations thereto a pneumatic tire of the well-known clincher or grappler construction in which the tires are secured by beads or hooks on the edges of the tire-covers engaging with inwardly-turned lips upon the wheel rim, and also tires of the kind in which the edges of the tire-cover are provided with inextensible wires, rings, or edges. For this purpose there is employed, according to this invention, a separate compound rim adapted to be used in conjunction with such tires and which has a capacity for accommodating itself to ordinary vehicle-wheels having considerable variations in the breadth of the iron tires thereon, and also for becoming automatically secured to the wheel upon the inflation of the tire, as I shall now describe with reference to the accompanying illustrative drawings, wherein—

Figure 1 is a cross-section, and Fig. 2 a developed part plan view, showing a wheel and pneumatic tire of the clincher or grappler construction with a compound rim constructed according to this invention. Figs. 3 and 4 are cross-sections showing modified constructions. Fig. 5 is a detail view.

The compound rim comprises an outer rim made in two annular parts or halves 1 1$^a$, arranged side by side and formed with outwardly-hooked lips 1$^b$, with which the beads or hooks 2 at the edges of the tire-cover 3 are designed to interlock, and within which outer rim is arranged an inverted channeled rim, likewise made in two annular parts 4 4$^a$, arranged side by side, but with their adjacent edges deeply crenelated, as shown at 4$^b$ 4$^c$, respectively, so as to extend between each other, as shown in Fig. 2. The parts 1 1$^a$ of the outer rim are connected, as by rivets 5, to the parts 4$^a$ 4, respectively, of the inner rim, so that each half of the outer rim is attached to the crenelated portions projecting beneath it of the half of the inner rim on the opposite side to it.

The arrangement, as will be readily seen, is such that on the two portions 1 1$^a$ of the outer rim being pressed apart by the inflation of the tire with which the compound rim is used the channel formed by and between the two parts 4 4$^a$ of the inner rim will automatically contract in breadth, so that the inwardly-extending flanges 4$^b$, forming the sides of the channeled rim, will close upon the felly 6 of the wheel to which the compound rim is applied and grip such felly with practically the whole force of the lateral expansion of the base of the tire due to the air-pressure in the tire, thereby rendering the compound rim as secure upon the wheel-felly 6 as the tire is ordinarily rendered secure in a grooved wheel-rim by the air-pressure.

Suitable means are preferably provided for securing together the ends of the annular parts of the compound rim, which may be each made in one piece or in sections. In either case the adjacent ends may be secured together by a plate 7, provided with studs 8, arranged to enter holes 9 in the said ends, as shown in Fig. 5. The plate ordinarily provided on the base of the air-valve may be used for carrying the said studs. Such a compound rim can be readily applied to wheels of different sizes circumferentially within reasonable limits by placing some suitable packing round the wheel when desirable before applying the compound rim to it, or such rims of a variety of circumferential lengths may be easily produced by forming them of sections of a comparatively small number of different lengths variously combined. Such compound automatically-gripping rims may be formed of various cross-sections and may be employed for securing tires, the covers of which have inextensible wires in their edges, to vehicle-wheels in compliance with the conditions herein stated, (that is to say, without the use of bolts or the like,) which conditions are believed to be essential to the efficient and successful accomplishment of this purpose.

Fig. 3 is a cross-section showing such a compound rim and tire. In this case the annular parts 1 1ª are provided with angular or flanged parts 10, adapted to receive the wired edges 2ª of the tire-cover 3. The tire may in this case be removed, after deflating it and releasing the air-valve, by pressing one wired edge toward the other at the opposite side of the base of the tire and springing a portion of the released side of the compound rim preferably at a point where two ends meet over the wheel-felly 6.

A compound rim constructed as described may, as shown in cross-section in Fig. 4, be provided with a central circumferential channel 11, formed by rings 12 12ª, which are of angular cross-section and may be of wood or other suitable material secured to the parts 1 1ª of the outer rim, so that such compound rim can be used in conjunction with such tires as those of the well-known Welch construction, which have endless wire rings 13 in the edges of the tire-cover 3.

What I claim is—

1. For connecting a pneumatic tire to a vehicle-wheel, a compound rim comprising an outer rim made in parts adapted to retain between them the base of a pneumatic tire, and an inner rim made in parts adapted to grip a wheel-rim between them, said inner and outer rims being adapted to be connected together so that lateral opening movement of the parts of the outer rim will cause lateral closing movement of the parts of the inner rim.

2. For connecting a pneumatic tire to a vehicle-wheel, a compound rim comprising an outer rim made in two annular parts arranged side by side and adapted to hold the edges of a tire-cover, and an inner rim of channel-section made in two annular parts arranged side by side and adapted when moved together to clamp a wheel-rim around which they are placed, each part of the outer rim being attached to that part of the inner rim that is on the opposite side of the compound rim substantially as described.

3. For connecting a pneumatic tire to a vehicle-wheel, a compound rim comprising an outer rim made in two main annular parts arranged side by side and adapted to hold the base of a pneumatic tire, and an inner rim of channel-section made in two main annular parts arranged side by side and having their adjacent edge portions crenelated and fitting one into the other and each connected to the oppositely-arranged part of the outer rim, substantially as herein described for the purpose specified.

4. For connecting a pneumatic tire to a vehicle-wheel, a compound rim comprising an outer rim made in two main annular parts 1, 1ª arranged side by side and having outwardly-hooked parts adapted to engage the edges of a tire-cover, and an inner rim made in two main annular parts 4, 4ª arranged side by side and having their adjacent edge portions crenelated and fitting one into the other and connected each to the oppositely-arranged part of the outer rim, substantially as described.

In testimony whereof I have signed my name to this specification in the presence of two subscribing witnesses.

THOMAS DUNN.

Witnesses:
EDMUND S. SNEWIN,
WM. O. BROWN.